(12) United States Patent
Akahori et al.

(10) Patent No.: US 7,785,116 B2
(45) Date of Patent: Aug. 31, 2010

(54) RESCUE TERMINAL STRUCTURE

(75) Inventors: Masahiro Akahori, Shizuoka (JP); Takao Nogaki, Shizuoka (JP); Toshinori Iwai, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 12/385,186

(22) Filed: Apr. 1, 2009

(65) Prior Publication Data

US 2009/0253311 A1 Oct. 8, 2009

(30) Foreign Application Priority Data

Apr. 3, 2008 (JP) ............................. 2008-097416

(51) Int. Cl.
*H01R 12/00* (2006.01)
(52) U.S. Cl. .................................................. 439/76.2
(58) Field of Classification Search ................ 439/76.2, 439/709
See application file for complete search history.

(56) References Cited

U.S. PATENT DOCUMENTS

| 4,238,140 | A | * | 12/1980 | Cairns et al. ................. 439/595 |
| 4,790,778 | A | * | 12/1988 | Seidenbusch ................. 439/811 |
| 5,011,417 | A | * | 4/1991 | Matsumoto et al. ......... 439/76.2 |
| 5,722,862 | A | * | 3/1998 | Glathe et al. ................. 439/709 |
| 6,322,376 | B1 | * | 11/2001 | Jetton .......................... 439/76.2 |
| 6,582,239 | B2 | * | 6/2003 | Ozawa ........................ 439/76.2 |
| 6,679,708 | B1 | * | 1/2004 | Depp et al. .................. 439/76.2 |
| 6,808,397 | B2 | * | 10/2004 | Kondo ......................... 439/76.2 |
| 6,811,412 | B2 | * | 11/2004 | Uezono ........................ 439/76.2 |
| 6,830,482 | B2 | * | 12/2004 | Matsumura et al. ..... 439/620.27 |
| 6,835,073 | B2 | * | 12/2004 | Kobayashi .................. 439/76.2 |
| 6,884,090 | B2 | * | 4/2005 | Kubota ........................ 439/76.2 |
| 6,905,372 | B2 | * | 6/2005 | Cabrera et al. .............. 439/709 |
| 6,922,331 | B2 | * | 7/2005 | Ikeda .......................... 361/624 |
| 7,011,551 | B2 | * | 3/2006 | Johansen et al. ............ 439/709 |
| 7,063,543 | B2 | * | 6/2006 | Okano et al. ............... 439/76.2 |
| 7,144,280 | B2 | * | 12/2006 | Cabrera et al. .............. 439/709 |
| 7,413,447 | B2 | * | 8/2008 | Yagi et al. ................... 439/76.2 |
| 7,549,872 | B2 | * | 6/2009 | Akahori et al. ............. 439/76.2 |
| 7,611,360 | B2 | * | 11/2009 | Akahori et al. ............. 439/76.2 |

(Continued)

FOREIGN PATENT DOCUMENTS

JP 2004-134215 4/2004

(Continued)

*Primary Examiner*—T C Patel
*Assistant Examiner*—Vladimir Imas
(74) *Attorney, Agent, or Firm*—Edwards Angell Palmer & Dodge LLP

(57) ABSTRACT

A block body made of insulating synthetic resin having a terminal supporting plate in one piece therewith. A plurality of elongated ribs project on one surface of the terminal supporting plate and a rescue terminal is arranged on the other surface of the terminal supporting plate. A bus bar is mounted in the block body. A clamping portion of a booster cable can grasp both the rescue terminal and the rib at one time. The plurality of ribs are parallel to each other. The dimension of the rib is defined such that the rib is placed under compressive deformation when the rib is clamped by the clamping portion. The block body has a hole through which the rescue terminal is passed such that the rescue terminal extends along and in contact with the other surface of the terminal supporting plate.

5 Claims, 4 Drawing Sheets

U.S. PATENT DOCUMENTS

| | | | |
|---|---|---|---|
| 7,612,647 B2* | 11/2009 | Onoda et al. | 337/229 |
| 2002/0016093 A1* | 2/2002 | Nakamura | 439/76.2 |
| 2002/0022388 A1* | 2/2002 | Oda | 439/76.2 |
| 2004/0029419 A1* | 2/2004 | Uezono | 439/76.2 |
| 2004/0033730 A1* | 2/2004 | Oda | 439/709 |
| 2004/0048520 A1* | 3/2004 | Kobayashi | 439/709 |
| 2004/0242080 A1* | 12/2004 | Lindenbaum | 439/709 |
| 2005/0250389 A1* | 11/2005 | Johansen et al. | 439/709 |
| 2006/0292904 A1* | 12/2006 | Kanou | 439/76.2 |
| 2008/0207017 A1* | 8/2008 | Clark et al. | 439/76.2 |

FOREIGN PATENT DOCUMENTS

JP      2004-134278      4/2004

* cited by examiner

RESCUE TERMINAL STRUCTURE

CROSS REFERENCE TO RELATED APPLICATION

The priority application Japan Patent Application No. 2008-097416 upon which this patent application is based is hereby incorporated by reference.

BACKGROUND OF THE INVENTION

1. Field of the Invention

The present invention relates to a rescue terminal structure for use in supplying electrical power to a vehicle by connecting a booster cable to a rescue terminal of for example an electrical junction box when a battery of the vehicle is dead.

2. Description of the Related Art

FIG. 6 shows a conventional rescue terminal structure (for example, see FIGS. 1 to 4 of Japanese Patent Application Laid-Open Publication No. 2004-134215).

The conventional rescue structure has a bus bar 52 provided on the plate-shaped block body 51 made of insulating synthetic resin and a rescue terminal 53 upstanding from the bus bar 52. A bolt 55 on the side of the block body 51 is passed through a hole 54 of the bus bar 52. An electrical wire (not shown) connected to a positive terminal of a battery is fastened by a nut and connected to the bolt 55. When the vehicle's battery is dead, the booster cable 6 (see FIG. 7) for electric power supply is connected to the rescue terminal 53.

Japanese Patent Application Laid-Open Publication No. 2004-134278 discloses a conventional rescue terminal structure wherein a cover (not shown) made of insulating synthetic resin is mounted to a block body (51), the cover has an opening through which the rescue terminal (53) protrude to an outside, and the opening is covered by a small inner cover (not shown). The block body (51) and the cover constitute a junction box body, and the junction box body, the bus bar (52), the rescue terminal (53), and a bolt (55) constitute the electrical junction box (see FIG. 1).

As shown in FIG. 6, the rescue terminal 53 has for example, a U-shaped cross-section. Also, it may be in a shape of a rectangular column. The electrical junction box is installed, for example, in a hood of a hybrid vehicle and the battery (not shown) is installed in a rear trunk. Since the battery is covered by a cover, it is not possible to connect a booster cable 6 to the battery as such when the battery is dead. A driver therefore has to open the hood and connect an end of the booster cable 6 to a positive rescue terminal 53 of the electrical junction box. The other end of the booster cable 6 is connected to a positive electrode (not shown) of a rescue vehicle's battery that supplies electric power to the dead battery of the driver's own vehicle.

As shown in FIG. 7, the booster cable 6 includes a clamping portion (crocodile clip) 7 that is made of electrically conductive metal and is closed by a force of a spring). The clamping portion 7 is connected to an end of an electrical wire 9. The clamping portion 7 includes a pair of chuck pieces 8 that each have an edge-shaped end 8a that holds the rescue terminal 53 and right and left sawtooth-like teeth 8b. The pair of chuck pieces 8 are energized in a closing direction by a force of a torsion coil spring (not shown) with the hinge 8c acting as a point of support.

SUMMARY OF THE INVENTION

A drawback of the conventional rescue terminal structure identified by the inventors of the present invention is as follows. When the battery is dead, the driver might be in a hurry to connect the booster cable to the rescue terminal. Also, it can happen that the booster cable might be pulled. In such cases, the clamping portion might be inadvertently detached from the rescue terminal, failing to stably and safely supply electric power to the battery waiting for revival.

In view of the above-identified problem, an object of the present invention is to provide a rescue terminal structure that allows the clamping portion of the booster cable to be firmly connected to the rescue terminal of the bus bar.

In order to achieve the above objective, the rescue terminal structure according to one embodiment of the present invention includes a terminal supporting plate formed in one piece with a body of a fuse block, the supporting plate and the body being made of insulating synthetic resin, a plurality of elongated ribs protruding on one surface of the terminal supporting plate; and a rescue terminal of a bus bar mounted in the body of the fuse block, the rescue terminal being arranged along the other surface of the terminal supporting plate such that both the rescue terminal and the rib are clamped at one time by a clamping portion of a booster cable.

With the construction and arrangement described above, the ribs are provided on one surface of the supporting plate, and the rescue terminal is positioned on the other (opposite) surface of the terminal supporting plate. Accordingly, the clamping portion of the booster cable for emergency power supply clamps both the rescue terminal and the ribs at one time, and the edge-shaped end and the sawtooth-like teeth of the clamping portion bite into the elongated rib or ribs so that the clamping portion is firmly secured with a large frictional force to the rescue terminal of the bus bar which is connected to the battery. When the driver or an operator is in a hurry to connect the clamping portion to the rescue terminal, or when a pulling force acts upon the clamping portion after the booster cable is connected, the clamping portion is prevented from being displaced or detached from the rescue terminal and thus the electric power can be safely and stably supplied.

Preferably, the plurality of ribs are parallel to each other. When the clamping portion of the booster cable clamps the rib along a length thereof, the plurality (if not all) of ribs are at one time clamped by the clamping portion of the booster cable (more specifically, by the edge-shaped ends of the clamping portion) and the edge-shaped ends bite into the ribs. Even when the pulling force acts upon the booster cable, the end of the clamping portion is in contact with the rib with a frictional force larger than the pulling force. Accordingly, undesirable displacement and detachment are prevented and electrical power can be supplied more safely and stably. The edge-shaped end of the clamping portion bites into the rib when the clamping portion of the booster cable is attached to the terminal supporting plate from above.

Preferably, a thickness of the rib is such that the rib is placed under compressive deformation when the rescue terminal and the rib are clamped by the clamping portion, so that the clamping portion of the booster cable bites into the rib to generate large frictional force and the displacement and detachment of the clamping portion form the rescue terminal is effectively prevented.

Preferably, the body of the fuse block has a hole for inserting the rescue terminal therethrough and allowing the rescue terminal to be provided along the other surface of the terminal supporting plate. By virtue of the hole, the bus bar is accommodated in the block body and at the same time the rescue terminal is allowed to be exposed via the hole to an outside with the rescue terminal slidably and smoothly placed on the other surface of the terminal supporting plate. The hole is a slit slightly larger than a cross-section of the plate-shaped rescue terminal. The hole defines the position of and supports the rescue terminal. Thus, arrangement of the rescue terminal is facilitated.

Preferably, the body of the fuse block is accommodated in a frame made of insulating synthetic resin, the frame has an opening that allows the rescue terminal and the terminal supporting plate having the ribs to be exposed to an outside of the frame, and the frame has an inner cover that covers the rescue terminal and the terminal supporting plate having the ribs.

With the construction and arrangement described above, electrical junction box, which is constituted for example by a body of the fuse block, the bus bar, the frame, and the fuses mounted to the body of the fuse block. It is preferable that a cover is mounted to the frame and the inner cover resides inside of the cover. Also, it is preferable that other blocks, units, and components other than the body of the fuse block are accommodated together in the frame. In a state where the terminal supporting plate and the rescue terminal are in contact with each other in the thickness direction, the rescue terminal is passed through and supported by the opening of the frame so as to be exposed via the frame to an outside. The inner cover of the frame serves to protect the rescue terminal and isolate the rescue terminal from other components of the electrical junction box. Connection of the booster cable to the rescue terminal is done with the inner cover opened. By a region around the opening of the frame, the rescue terminal is isolated from electrical components such as a fuse and a connector on the side of the block body, and the fuse and connector on the side of the block body is protected against adverse effect that might be caused by connecting the booster cable to the rescue terminal.

BRIEF DESCRIPTION OF THE DRAWINGS

Other features, objects and advantages will become more apparent upon reading of the following detailed description in conjunction with the accompanying drawings in which.

DESCRIPTION OF AN EXEMPLARY EMBODIMENT

A rescue terminal structure according to one embodiment of the present invention is described below with reference to FIGS. 1 to 5.

Figure 1:
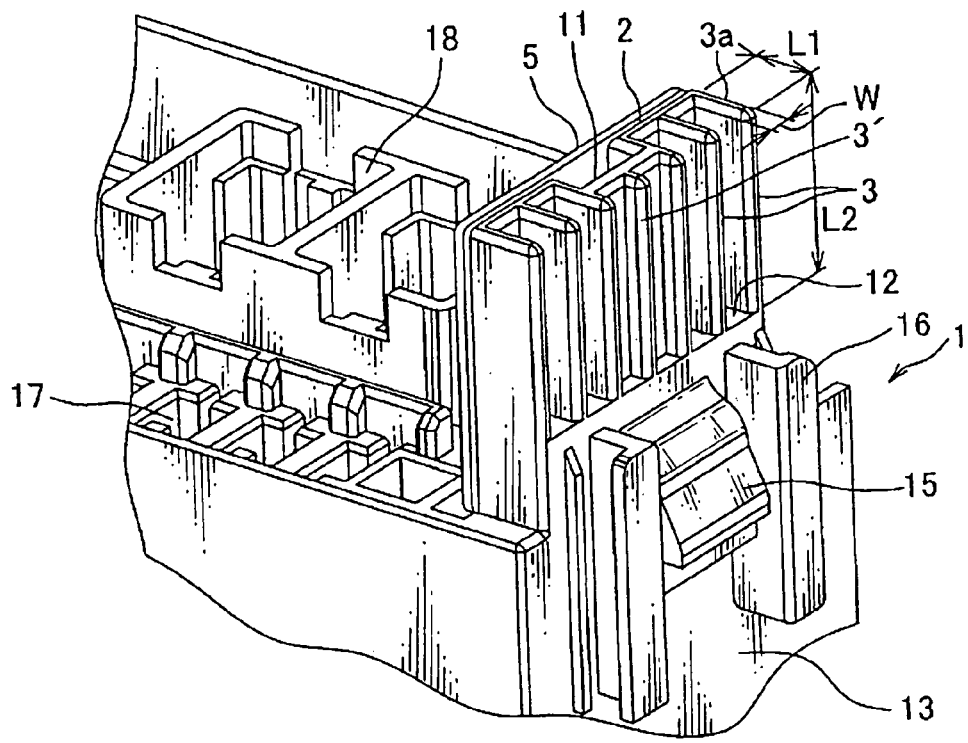
FIG. 1 is a perspective view of a rescue terminal structure according to one embodiment of the present invention.

Referring to FIG. 1, the rescue terminal structure includes three constituent parts, i.e., a terminal supporting plate 2, a plurality of ribs 3, and a rescue terminal 5.

The terminal supporting plate 2 is formed in one piece with a body of a fuse block made of insulating synthetic resin (block body 1 or junction box body). The terminal supporting plate 2 has the plurality of elongated vertical ribs 3 extending parallel to each other and each upstanding on the outer surface of the terminal supporting plate 2.

Figure 7:
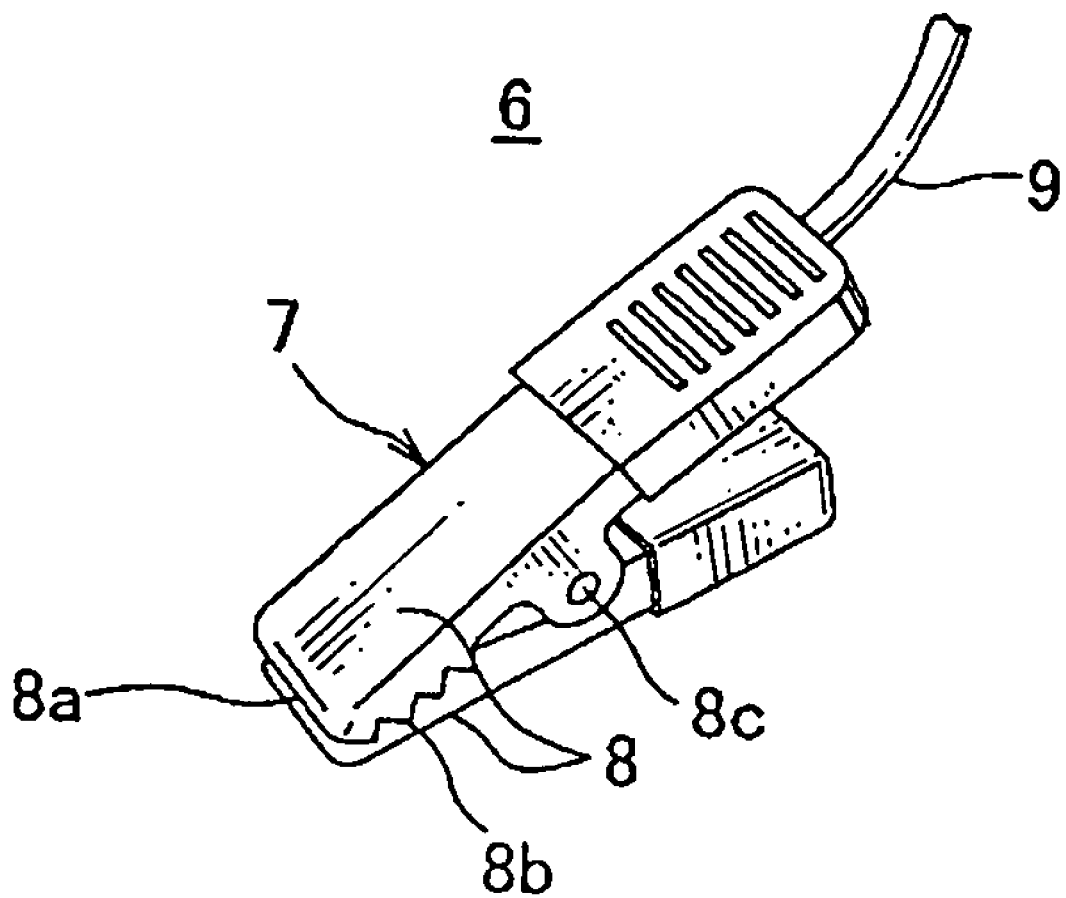
FIG. 7 is a perspective view of a conventional booster cable that is connected to the rescue terminal.

The bus bar has the rescue terminal 5 in a shape of a flat vertical plate. The bus bar 4 is made of electrically conductive metal (see FIG. 2). The rescue terminal 5 is arranged along and in contact with an inner surface of the terminal supporting plate 2 (i.e., a surface opposite the above-mentioned outer surface on which the ribs 3 are provided). A clamping portion 7 (a clip in a shape of a crocodile or alligator's mouth) of a booster cable 6 (see FIG. 7) bite to some extent into ribs 3 made of synthetic resin and thus clamps the rescue terminal 5 and the ribs at one time so as to be connected to the rescue terminal 5.

The ribs 3 according to the preferred embodiment are seven in number and extend parallel to each other. The central rib 3' is formed on and protrudes from a wall (indicated by a reference sign 11 for simplicity) of a hole 11, the wall bridging the two ribs 3. The hole 11 has a U-shaped cross-section and is formed for example by die cutting or injection molding. The hole 11 is provided at the central portion widthwise of the terminal supporting plate 2 with a small amount of protrusion relative to those of the other ribs 3. This configuration of the central rib 3' and the hole 11 is intended to form an injection-molded locking projection (not shown) on the block body 1. The locking projection configured to be brought into engagement with a locking hole 10 formed (injection-molded, die-cut or punched, for example) on the rescue terminal 5 (see FIG. 2). The ribs 3 other than the central rib 3' are formed on and protrude from the outer surface of the terminal supporting plate 2 with a large amount of protrusion L1 relative to that of the central rib 3'. Note that the ribs with the reference sign 3 may generically include the central rib with a reference sign 3'.

A height (degree of protrusion) of the rib 3 is larger than a width (or thickness) W of the rib 3 so that the rib 3 can be readily compressed and deformed in a direction orthogonal to the outer surface of the rescue terminal 5. The plurality of ribs 3 constitute a structurally weakened portion of the terminal supporting plate 2. Also, the supporting plate 2 is reinforced by the wall 11 with a U-shaped cross-section at the center of the supporting plate 2. In a sense, by virtue of the wall 11 bridging two ribs 3, the supporting plate 2 can be strengthened by the ribs 3 which constitute the structurally weakened portion. Accordingly, the deformation and breakage of the supporting plate 2 as such is prevented even when the clamping portion 7 (see FIG. 7) is abruptly attached to or inadvertently detached from the supporting plate 2.

The ribs 3 and 3' may upstand to the same degree (with the same height) from the terminal supporting plate 2 if the locking hole 10 (see FIG. 2) and the locking protrusion are provided at a portion of the bus bar other than the rescue terminal 5. The width (or thickness) of the rib 3 is so small that the rib 3 can be clamped by the clamping portion 7 and subjected to compressive plastic deformation (or elastic deformation). The width W, the height (or degree of protrusion) L1, and an overall length L2 of the rib 3 may vary insofar as the rib 3 clamped by the clamping portion 7 is placed under the compressive plastic deformation (or elastic deformation).

The clamping portion 7 (see FIG. 7) clamps the rescue terminal 5 and the rib 3 at one time between a first chuck piece and a second chuck piece from above and substantially vertically. However, even when the clamping portion 7 clamps the rescue terminal 5 and the rib 3 more or less slantwise in the rescue terminal's width direction, deviating from the above-described vertical clamping direction, an end 8a (FIG. 7) and a saw-tooth-like teeth 8b of the chuck piece bite into the ribs 3 so that the clamping portion 7 is not detached accidentally or displaced inadvertently.

The terminal supporting plate 2 is formed at an end of the block body 1. The terminal supporting plate 2 faces an inside of the block body 1. The ribs 3 faces an outside of the block body 1. An upper end 3a of the rib 3 and an upper end of the supporting plate 2 substantially coincide with each other, so that the upper end of the supporting plate 2, and the rescue terminal 5, which is a rectangular member over an entire width of the supporting plate 2, upwardly projects until reaching an upper end of the supporting plate 2.

A lower portion of the rib 3 terminates at a horizontal thick wall 12. The wall 12 is also formed in one piece with the lower end of the supporting plate 2. Also, the length of the rib 3 is orthogonal to the wall 12. Further, the thick wall 12 integrally continues to a vertically extending outer wall 13 of the block body 1. The outer wall 13 has a locking arm 15 that engages a frame 14 (see FIG. 5) made of insulating synthetic resin and also has vertically extending sliding rails 16. A plurality of fuse-mounting portions 17 and 18 are formed inside of the block body 1. The fuse-mounting portions 17 and 18 are arranged in parallel with each other.

Figure 2:
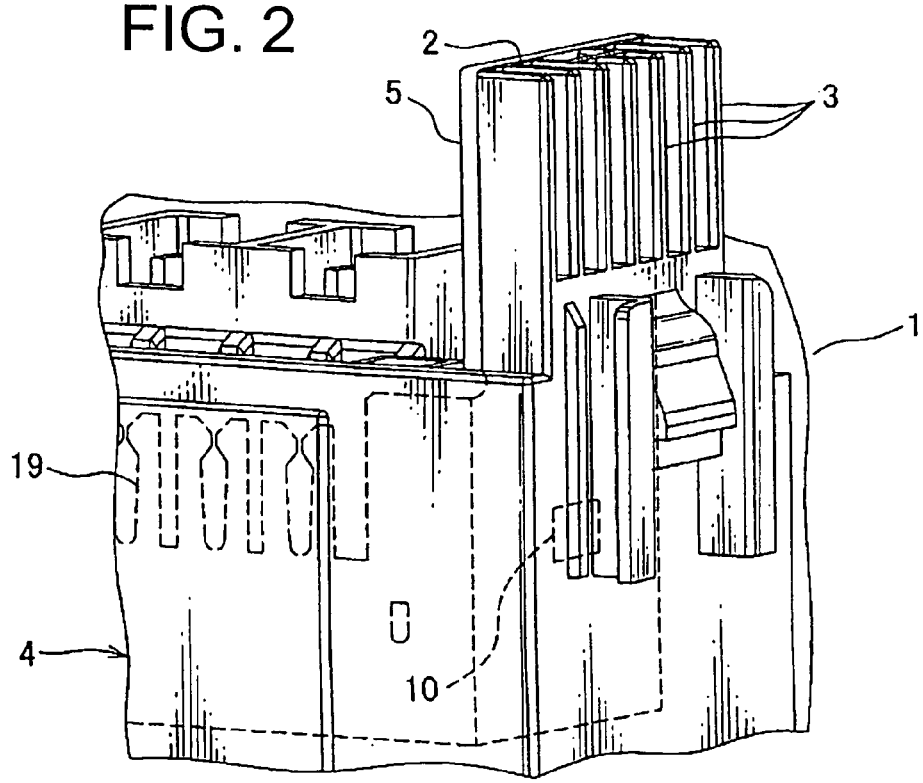
FIG. 2 is a perspective view of a bus bar incorporating the rescue terminal structure shown in FIG. 1.

As shown in FIG. 2, the bus bar 4 is accommodated in the block body 1. The rescue terminal 5 extends in a shape of an L and integrally continues to an end of the bus bar 4. A bus bar's terminal 19 for use in connecting a fuse to the body 1 is placed under the fuse-mounting portions 17, 18 of the block body 1 when the fuse block and the bus bar 4 are assembled.

Figure 3:
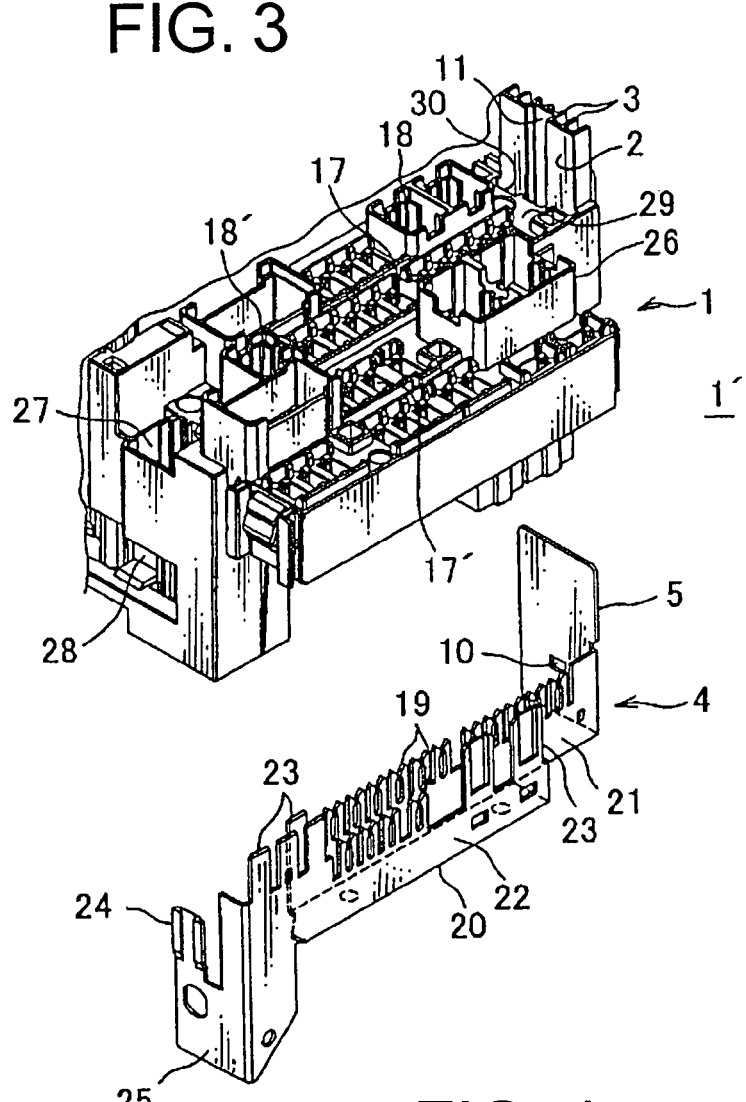
FIG. 3 is an exploded perspective view of a fuse block incorporating the rescue terminal structure shown in FIG. 1
Figure 4:
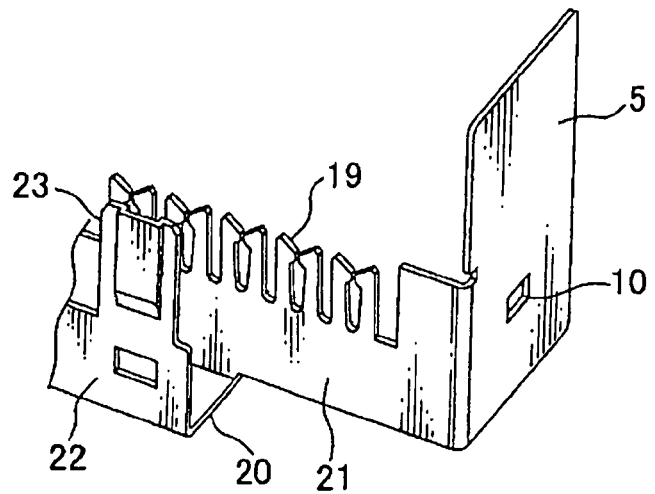
FIG. 4 is a perspective view of the bus bar of FIG. 2 viewed from a different angle.

Referring to FIG. 3, the bus bar 4 is mounted in the block body 1 from underneath guided by a vertical groove (not shown). As shown in FIGS. 3 and 4, the bus bar 4 according to the preferred embodiment is made for example by die-cutting and shape-processing an electrically conductive metal plate such that first and second side plates 21 and 22 extend vertically at both sides of the horizontal bottom plate 20. The clamp terminal 19 and a tab terminal 23 for connecting a connector to the block body 1 are formed in one piece with the first and second side plates 21 and 22, respectively (see FIG. 4). One end of the metal plate extends vertically to constitute the rescue terminal 5 at a front end of the side plate 21. Meanwhile, a plate 25 having a tab terminal 24 in one piece therewith is formed at a rear end of the second side plate 22. The tab terminal 24 is for use in electric power supply.

Still referring to FIG. 3, the second side plate 22 of the bus bar 4 is disposed under the fuse-mounting portion 17', which is a second row (viewed from the proximal side of the block body 1), and a connector housing 26. The first side plate 21 of the bus bar 4 is disposed under the fuse-mounting portion 17 in a third row and a connector housing (a fusible link mounting portion) 18'. The clamping terminal 19 is accommodated in the fuse-mounting portion 17, and the tab terminals 23 are accommodated in the connector housings 18' and 26. Another downstream-side bus bar (not shown) is provided for the other fuse-connecting portions.

The rear-end tab terminal 24 is accommodated in the connector housing 27 provided at the rear side of the block body 1. The tab terminal 24 is connected to a connector (not shown) of a wiring harness that is connected to a positive electrode of a vehicle's battery (not shown). A terminal (not shown) of a wiring harness connected for example to an alternator is secured by a bolt and connected to the rear side plate 25 via a high current fuse (not shown) provided in an opening 28.

The terminal supporting plate 2 is formed and upstands on an upper wall 29 at the front side of the block body 1. A slit-shaped hole 30 for insertion of the rescue terminal 5 is provided on the upper wall and extends in the vertical direction. A flat surface (for simplicity represented by the sign 2) of the supporting plate 2 is found above the hole 30. Also, the surface of the supporting plate 2 continues integrally to the inner wall of the hole 30.

With the bus bar 4 accommodated in the block body 1 from below, the rescue terminal 5 is passed from below through the slit-shaped hole 30 and extends along and in contact with the inner surface of the supporting plate 2. The upper openings of the fuse-mounting portions 17 and 17' are arranged parallel to each other on the upper wall 29 of the block body 1. It should be noted that the adjectives such as front, rear, right, and left that appear in this specification is intended for not specific technical implication but convenience of explanation.

Figure 5:
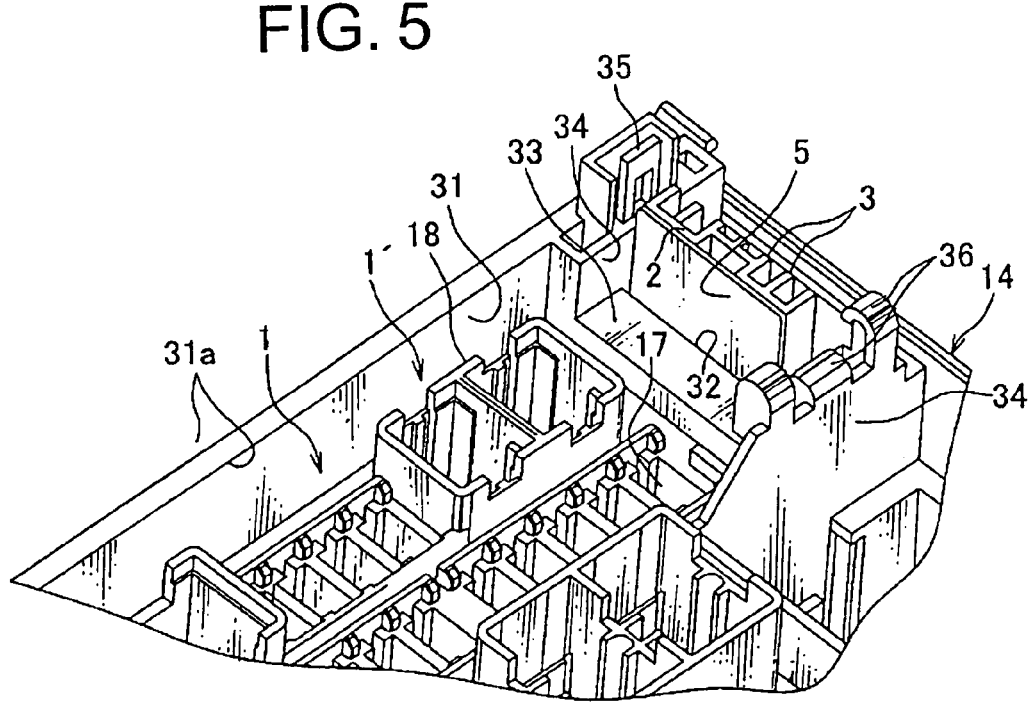
FIG. 5 is a perspective view of the fuse block of FIG. 3 accommodated in a frame.

Referring now to FIG. 5, the block body 1 is accommodated, from below, inside of the substantially rectangular frame 14. A fuse block 1', which is an assembly including the block body 1, a bus bar 4, and a fuse (not shown), is placed inside of the wall 31 of the frame 14.

The frame 14 has in one piece therewith (a) an opening 32 that makes the rescue terminal 5 and the terminal supporting plate 2 protrude upward, (b) a horizontal wall 33 defining the opening 32, (c) a pair of vertical walls 34 upstanding such that the horizontal wall 33 is positioned between the vertical walls 34. These are provided at one end of the frame 14. Also, (d) a resilient engagement piece 35 for engagement of an inner cover is integrally formed on the upper portion of one of the vertical walls 34. A hinge portion 36 for opening and closing of the inner cover is integrally formed on the upper portion of the other vertical wall 34.

The rescue terminal 5 and the terminal supporting plate 2 upwardly projecting out of the opening 32 are covered by the inner cover (not shown) made of insulating synthetic resin for protection and isolation. The horizontal wall 33 at a periphery of the opening 32 makes the rescue terminal 5 spaced away from the fuse-mounting portions 17, 18 of the fuse block 1', thus improving isolation of the rescue terminal with respect to the fuses and the connector terminals (not shown).

Having described the basic configuration and arrangement of the rescue terminal structure according to one embodiment of the present invention, the following summarizes a mode of operation of the same rescue terminal structure.

First, when the battery of the vehicle is dead, a driver or an operator opens a cover (not shown) made of insulating synthetic resin covering the upper opening 31a of the frame 14. Next, the operator opens the inner cover (not shown). Further, he or she connects the clamping portion 7 (the crocodile clip) of the booster cable 6 (see FIG. 7) to the rescue terminal 5 and the supporting plate 2 such that both the rescue terminal 5 and the ribs 3 of the supporting plate 2 are clamped by the two chuck pieces of the clamping portion 7.

At this point, the end 8a and the sawtooth 8b of the first chuck piece 8 of the clamping portion 7 is spring-biased and brought into contact with the rescue terminal 5. The end 8a and the sawtooth 8b of the other chuck piece 8, energized by the biasing spring, bite into the rib 3 of the supporting plate 2 so that the clamping portion 7 and accordingly the booster cable 9 are firmly secured and connected to the rescue terminal 5. Since the rib 3 is formed thin and made of insulating synthetic resin, the rib 3 yields to the spring force of the spring in the clamping direction of the clamping portion 7 and placed under compressive deformation with the end 8a and the sawtooth 8b biting into the rib 3.

Thus, even when the operator is in a terrible hurry to connect the clamping portion 7 to the rescue terminal 5, or even when the attached booster cable 6 is pulled, the clamping portion 7 is effectively prevented from being detached from the rescue terminal 5 and electrical power can be stably and safely supplied to the battery.

Although the preferred embodiment of the present invention has been fully described, the appellation of the components constituting the rescue terminal structure may be altered as appropriate for convenience of explanation. For example, although the fuse block 1' as such is defined as the electrical junction box in the preferred embodiment, the assembly incorporating the fuse block 1', the frame 14, and the cover (not shown) may be referred to as the electrical junction box.

Figure 6:
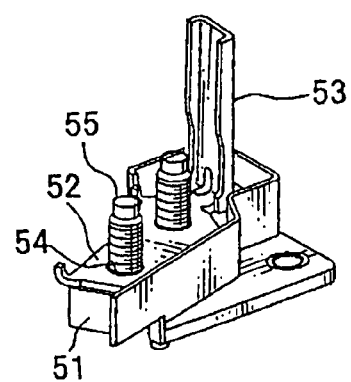
FIG. 6 is a perspective view of a conventional rescue terminal structure.

In the preferred embodiment, the rescue terminal structure is incorporated into the electrical junction box. However, when the rescue terminal 5 is provided not on the electrical junction box but on the block body 51 made of insulating synthetic resin (see FIG. 6 illustrating the conventional device), the terminal supporting plate 2 having the ribs 3 may be formed in one piece with the block body 51 and the rescue terminal 5 may be arranged along the terminal supporting plate 2.

In the preferred embodiment, in order to connect the booster cable 6 to the rescue terminal 5 from above and in a vertical direction, the terminal supporting plate 2 upstands vertically and the ribs 3 are formed on the terminal supporting plate 2 orthogonal to the outer surface of the terminal supporting plate 2. However, it is also possible to form the ribs 3 on the terminal supporting plate 2 such that the ribs are arranged horizontal to each other when the booster cable 6 is to be connected to a lateral side of the rescue terminal 5. In this case, it is preferable that the block body 1 includes an isolating portion that supports the clamping portion 7 so that the clamping portion 7 is prevented from deviating downward due to her own weight.

Although, in the preferred embodiment, the ribs 3 extend parallel to each other, it is also possible to provide a lattice of ribs extending vertically and ribs extending horizontally. In this case, each rib 3 is to have a height and a width that allow the rib 3 clamped by the clamping portion 7 can be compressed and deformed. An amount (or a depth) of compressive deformation has only to be such that the rib traps the clamping portion 7, exerting large frictional force that prevents displacement of the clamping portion 7.

In the preferred embodiment, the rescue terminal structure is incorporated into the fuse block 1'. However, the rescue terminal structure of the present invention is also applicable to devices other than the fuse block 1' such as a relay block and a connector block (not shown). In that case, the body 1 of the fuse block will be read as a relay block body and a connector block body, respectively.

Having now fully described the preferred embodiment of the present invention, it is clear that the descriptions and explanation contained herein are only cited by way of example rather than limitation, and therefore the present invention can be effectuated with modification and variation without departing from the scope and sprit of the present invention.

What is claimed is:

1. A rescue terminal structure comprising:
    a terminal supporting plate formed in one piece with a body of a fuse block, the supporting plate and the body being made of insulating synthetic resin;
    a plurality of elongated ribs protruding on one surface of the terminal supporting plate; and
    a rescue terminal of a bus bar mounted in the body of the fuse block, the rescue terminal having a flat plate shape and being positioned on the other surface of the terminal supporting plate such that both the rescue terminal and the ribs are clamped at one time by a clamping portion of a booster cable.

2. The rescue terminal structure as set forth in claim 1, wherein each of the ribs has a thickness that allows the rib to be placed under compressive deformation when the rescue terminal and the rib are clamped by the clamping portion.

3. The rescue terminal structure as set forth in claim 2, wherein the plurality of ribs are parallel to each other.

4. The rescue terminal structure as set forth in claim 3, wherein the body of the fuse block has a hole for inserting the rescue terminal therethrough and allowing the rescue terminal to rest on the other surface of the terminal supporting plate.

5. The rescue terminal structure as set forth in claim 4, wherein the body of the fuse block is accommodated in a frame made of insulating synthetic resin, the frame has an opening that allows the rescue terminal and the terminal supporting plate having the ribs to be exposed to an outside of the frame, and the frame has an inner cover that covers the rescue terminal and the terminal supporting plate having the ribs.

* * * * *